Feb. 25, 1969 — LE ROY M. VARGA — 3,429,652
DRAINING CONVEYOR
Filed Oct. 15, 1965
Sheet 1 of 4
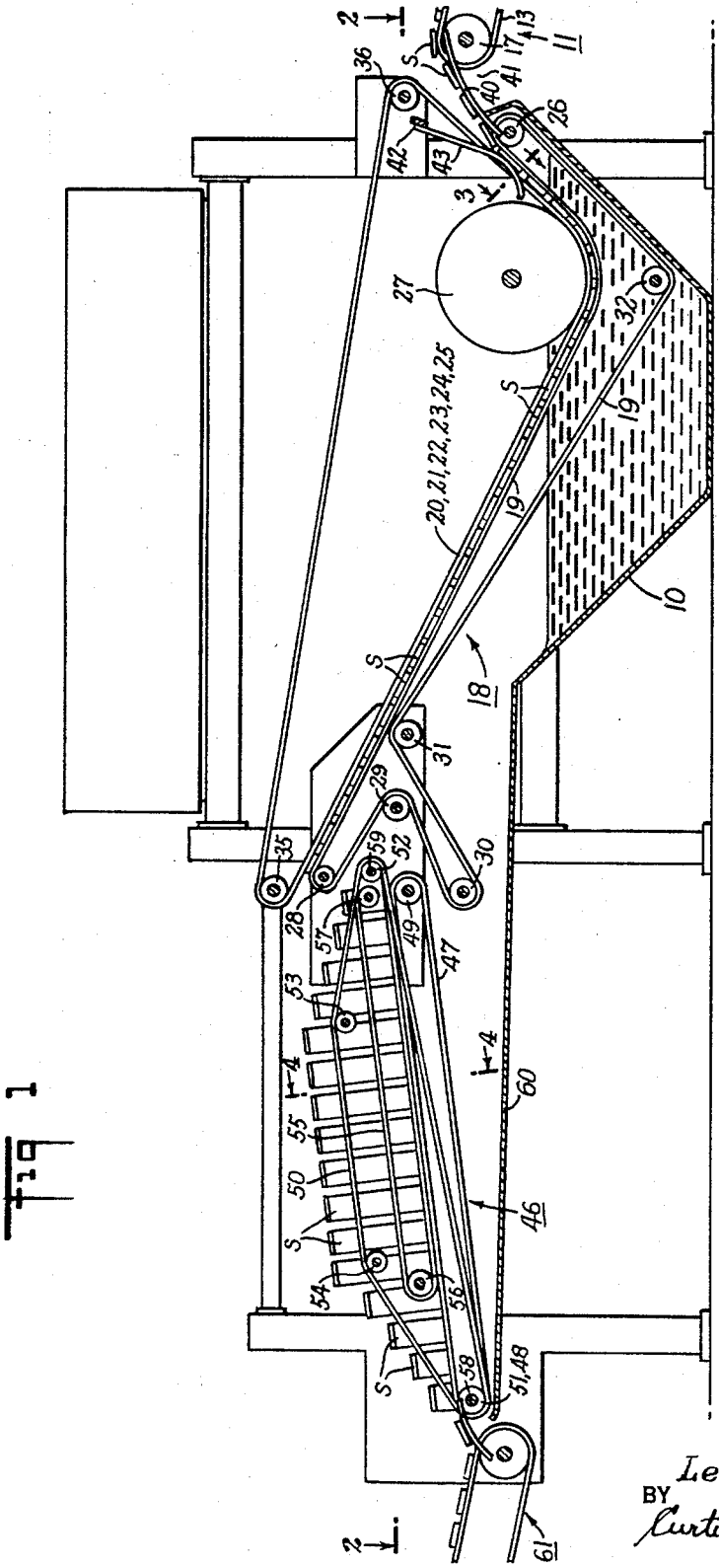
INVENTOR
*Leroy M. Varga*
BY *Curtis, Morris & Safford*
ATTORNEYS

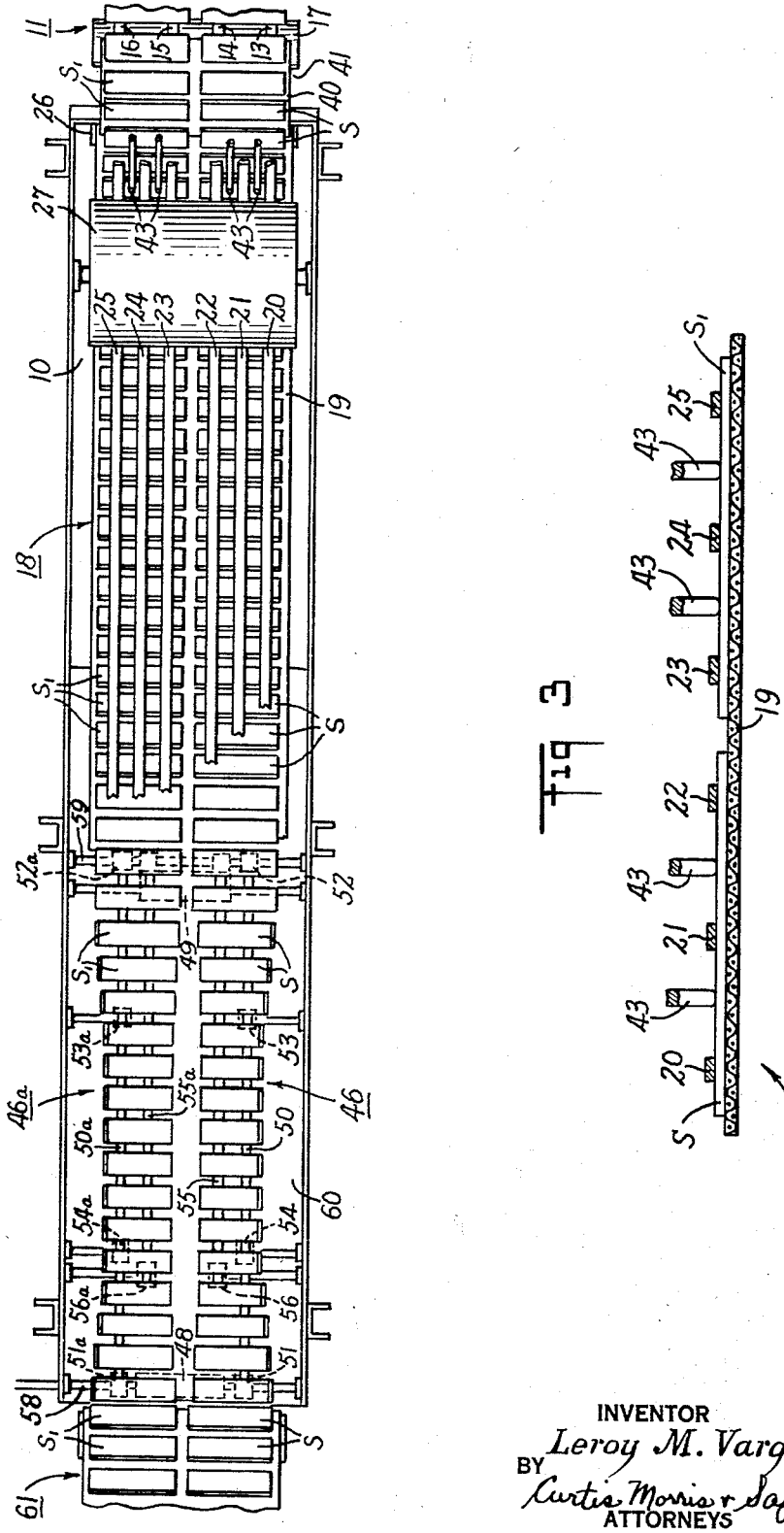

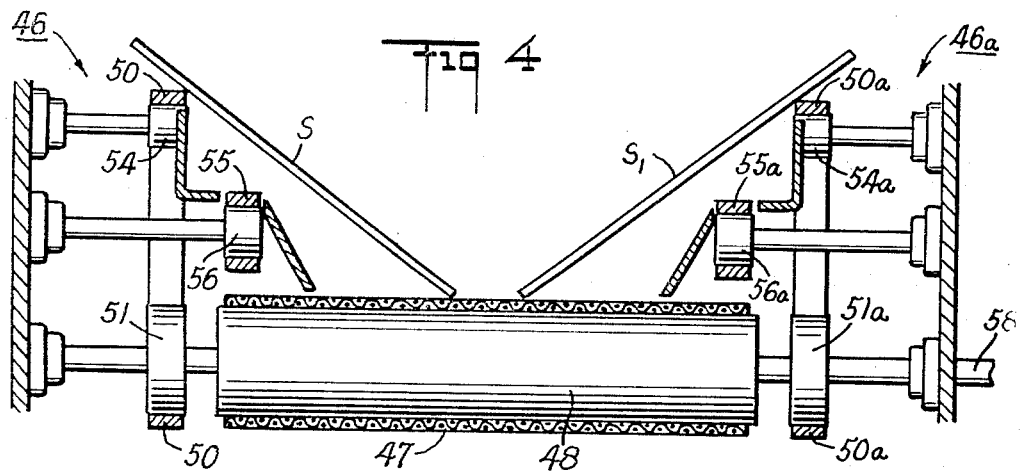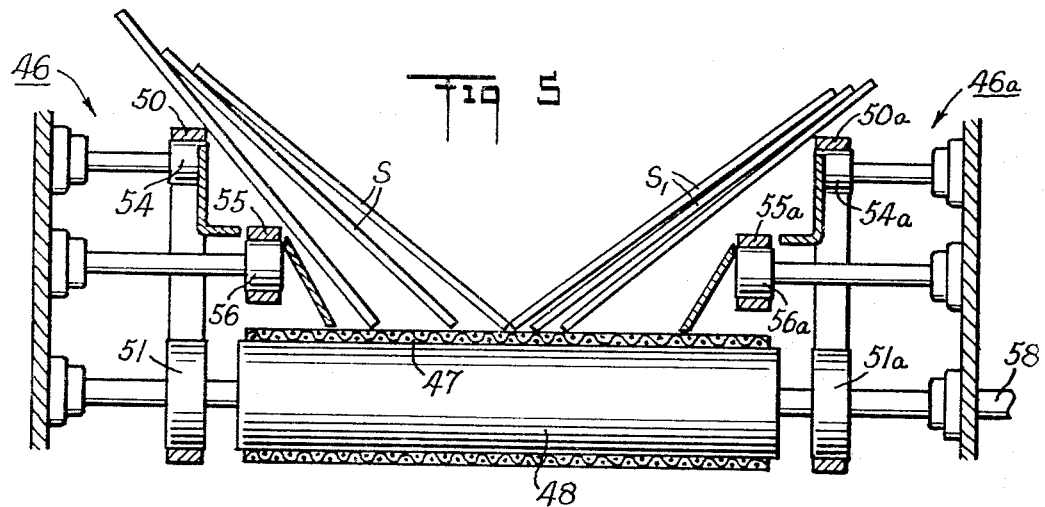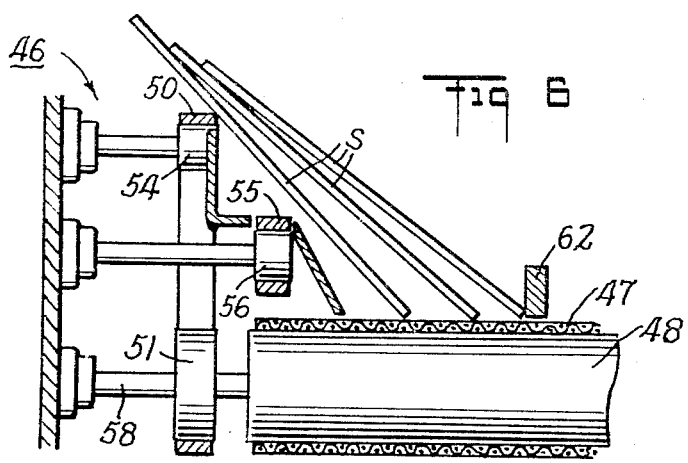

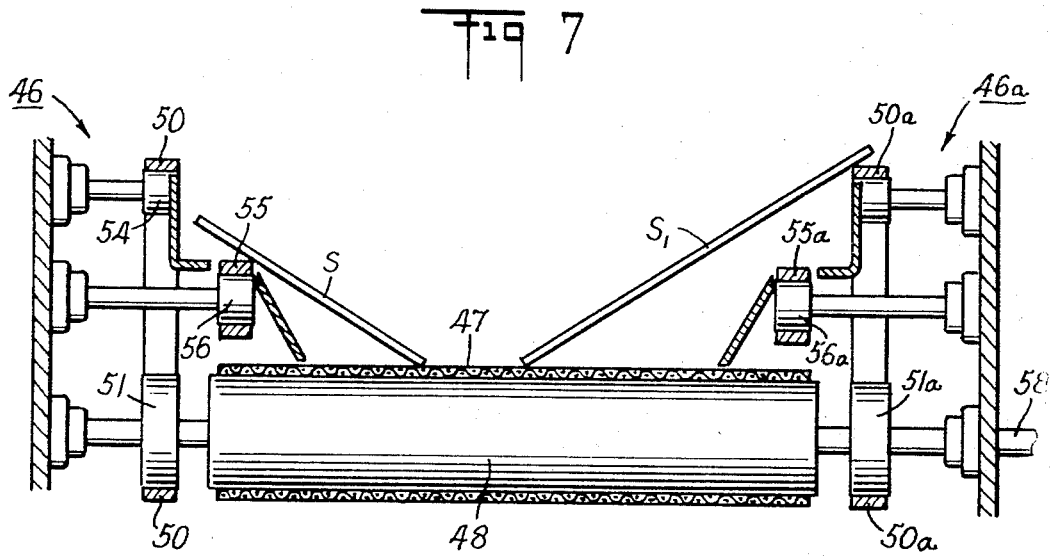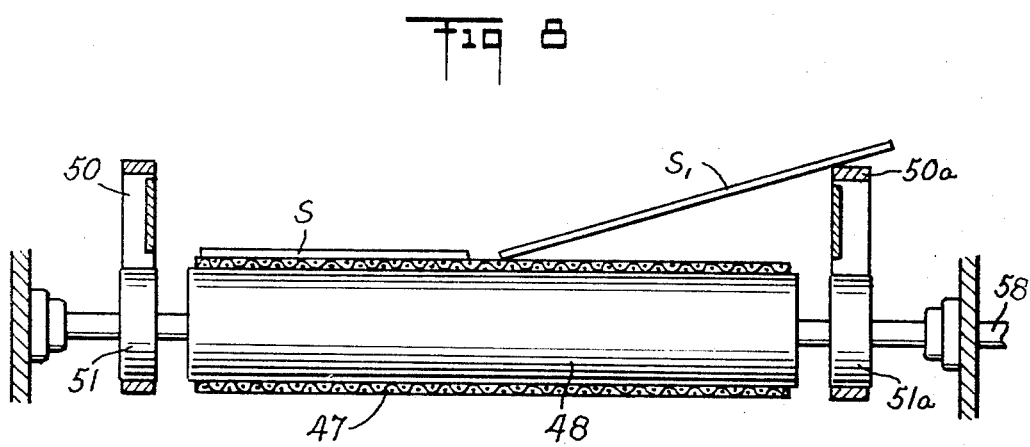

United States Patent Office 3,429,652
Patented Feb. 25, 1969

3,429,652
DRAINING CONVEYOR
Le Roy M. Varga, Dover, N.J., assignor to Stapling Machines Co., Rockaway, N.J., a corporation of Delaware
Filed Oct. 15, 1965, Ser. No. 496,436
U.S. Cl. 21—70         9 Claims
Int. Cl. B27k 3/00

ABSTRACT OF THE DISCLOSURE

An apparatus for dipping slat material in a liquid which includes a liquid tank and a conveyor for moving said slat material through the tank and further including a slat draining means at the discharge end of the conveyor. The conveyor has inner and outer courses onto which the slat material is discharged and guide means for guiding the outer course upwardly from its receiving end relative to the inner course to tilt and, thereby, drain surplus solution from the slat material.

---

The present invention relates to dipping slat-like parts in liquids and more particularly to an improved construction to facilitate and control the draining of surplus liquid therefrom.

While the present invention may have other applications, it is particularly adapted for use with apparatus for immersing wooden veneer slats in a chemical treating solution. Such veneer slats are used in making crates and wire bound boxes for shipping perishable products such as fruits and vegetables. The veneer slats are produced by rotating a log relative to a cutting blade which shears off a layer of wood of a thickness corresponding to the setting of the blade. The rotating log is pre-scored axially to determine slat width by a set of knives mounted on a roller opposite the cutter blade. The veneer continuously cut from the log then breaks up into pre-scored sections. These sections or slats of veneer are continuously conveyed away from the cutting blade by a suitable conveyor.

It is a common practice to chemically treat the veneer slats so formed to preserve the wood and/or dye it to change its color. The chemicals used to treat the slat material, such as germicides, fungicides, dyes, etc., are in solution and the slats are immersed in the solution to coat all surfaces. To this end, the slat material, either in single or multiple layers, is delivered to a conveyor which grips and moves it through a tank of solution to immerse the slats therein. After immersion, the slats are conveyed away from the tank and during their travel the solution drains therefrom in a haphazard manner. Besides wasting the chemical treating solution, the prior methods of treating the slats produce an uneven draining of solution from the slats and the uncontrolled dripping of the solution from various points along the slats creates a nuisance.

One of the objects of the present invention is to provide a conveyor for supporting the slat material on a slant to the horizontal after it is removed from the dipping tank to rapidly drain surplus solution therefrom in a uniform manner.

Another object is to provide a conveyor for automatically tilting the slat material from a substantially horizontal to an upwardly inclined position and to separate the slats as they move away from the tank of solution to control and limit dripping to a predetermined area.

Still another object is to provide a conveyor for tilting the slats from a horizontal to a slanted inclined position to facilitate draining which is of relatively simple and compact construction, economical to manufacture and one which is reliable in operation.

These and other objects will become more apparent from the following description and drawings in which like reference characters denote like parts throughout the several views. It is to be expressly understood, however, that the drawings are for the purpose of illustration only and are not a definition of the limits of the invention, reference being had for this purpose to the appended claims.

In the drawings:

FIGURE 1 is a side elevational view of an apparatus for dipping slat material in a treating solution which incorporates the slant conveyor of the present invention to facilitate draining of surplus solution from the slats;

FIGURE 2 is a plan view of the complete apparatus and showing the manner in which separate rows of slats are conveyed through the chemical treating solution and slant conveyor for tilting the slats to facilitate draining;

FIGURE 3 is a transverse sectional view taken on line 3—3 of FIGURE 1 and showing the double belt conveyor for moving the slat material through the solution;

FIGURE 4 is a transverse sectional view taken on line 4—4 of FIGURE 3 and showing the separate conveyor belts at successively higher levels to tilt and support the slats in a position inclined to the horizontal;

FIGURE 5 is a view similar to FIGURE 4 showing how a plurality of layers of slats are tilted into spaced relation to each other by the conveyor so that surplus solution may run down the surfaces between adjacent slats;

FIGURE 6 is a view similar to FIGURE 5 showing a slant conveyor at one side only and a rail for limiting the lateral movement of the bottom ends of the slats;

FIGURE 7 is a view similar to FIGURES 5 and 6 and showing how slats of unequal length and width may be supported by the slant conveyors; and FIGURE 8 is a view similar to the FIGURES 5 to 7 showing still another arrangement in which each slant conveyor comprises only one upper course of conveyor belts.

Referring now to the drawings, FIGURE 1 illustrates an apparatus for treating slat material with a solution and incorporating the slant conveyor of the present invention. The apparatus comprises a tank 10 containing a chemical solution for treating the wooden slat material supplied thereto from a feeding conveyor 11. As stated above, the wooden slat material in the illustrated embodiment comprises sections of a continuous sheet of veneer cut from a log and broken into strips or slats S as the sheet leaves the cutting blade. For purposes of illustration the slat material is shown in the drawings in two separate rows of slats, see FIGURE 2, with the individual slats S and $S_1$ in each row arranged successively, one after the other, but it will be understood that the slats would actually feed through the apparatus in a more haphazard arrangement and in a plurality of overlying layers of varying thickness.

Slats S and $S_1$ of each row are supported by spaced belts 13, 14 and 15, 16 of the feeding conveyor 11 having a pulley 17 at its delivery end. The slat material S and $S_1$ from the feeding conveyor 11 is delivered between the belts of a double belt conveyor 18 for immersing the slat material in the chemical solution. Double belt conveyor 18 comprises a porous bottom belt 19, preferably of wire mesh, and overlying narrow belts 20, 21, 22 and 23, 24 and 25 for the rows of slats S and $S_1$, respectively, as shown in FIGURE 3. The bottom conveyor belt 19 extends around a pulley 26 adjacent the pulley 17 of the conveyor 11, under a drum type pulley 27 and then around an upper pulley 28 located forwardly of and above the tank 10. Belt 19 then is directed around the reversing pulleys 29, 30, 31 and 32 back to the first pulley 26. The narrow belts 20 to 25 are arranged in parallel, see FIGURE 2, and extend under the pulley 27 and around pulleys 35 and 36. Belts 19 through 25 are driven at the same linear speed by, for example, pulleys 28 and 35 so that the belts 19 and 30 grip the slats S and $S_1$ between them, carry them down into the solution in the tank 10 as they pass around the drum pulley 27 and then deliver the slats upwardly through an inclined path to a position above and to the left of the tank 10 as viewed in FIGURE 1. A bridge 40 of narrow strips extends between the pulleys 17 and 26 of the conveyors 11 and 18, see FIGURE 1, to convey the slat material from one conveyor to the other and provide a throat 41 therebetween through which trash may fall. A rake 42, see FIGURE 1, also is provided having fingers 43 extending between the narrow belts 20 to 25 to engage and guide the slats S and $S_1$ between the bottom and overlying belts 19 and 20 to 25 of the double belt conveyor. Thus, slats S and $S_1$ are fed to and through tank 10 by conveyors 11 and 18 to immerse the slat material in the chemical treating solution in the tank and the wet treated slats are discharged at a location above and to the left of the tank as viewed in FIGURE 1.

In accordance with the present invention a slant conveyor 46 is provided at the outlet end of the conveyor 18 for tilting the slat material at an angle to the horizontal. Slant conveyor 46 receives slats S and $S_1$ in a substantially horizontal position and tilts them upwardly at an angle to facilitate draining of the surplus solution therefrom as they move away from the treating tank and dry all surfaces of the slats uniformly.

A slant conveyor 46 may be provided at one side only to tilt slats S in one row, or slant conveyors 46 and 46a may be provided on opposite sides to tilt slats S and $S_1$ in both rows; and each slat slant conveyor may have a single course of elevated auxiliary supporting elements, or a plurality of courses of elevated supporting elements. In the illustrated embodiment slant conveyors 46 and 46a are provided at opposite sides for the separate rows of slats S and $S_1$ and each has a plurality of elevated courses for engaging the slats S and $S_1$ of each row to tilt them at an angle to the horizontal.

As shown most clearly in FIGURES 1 to 4, the slant conveyor 46 comprises a porous bottom belt 47, preferably of wire mesh, which extends around the pulleys 48 and 49. The elevated auxiliary supporting elements 50 and 50a are provided at opposite sides of bottom porous belt 47 and may be articulated segments, either with or without extensions, continuous chains of connected links, or narrow flexible belts. The auxiliary supporting elements 50 and 50a are shown in the form of narrow belts at opposite sides of the bottom supporting belt 47 and each moves in a trapezoidal path as guided by pulleys 51, 52, 53 and 54, see FIGURE 1. Pulleys 51 and 51a are mounted on the same shaft as the pulleys 48, see FIGURE 4, but the pulley 52 is mounted above and to the right of pulley 49 as viewed in FIGURE 1. Pulleys 53 and 54 are located above and inwardly from pulleys 51 and 52. Thus, each auxiliary supporting belt 50 and 50a is inclined upwardly between the pulleys 52, 52a and 53, 53a, respectively, is parallel to the bottom belt 47 between the pulleys 53, 53a and 54, 54a and is inclined downwardly between the pulleys 54, 54a and 51, 51a to be level of the bottom belt.

Intermediate supporting elements 55 and 55a also are provided in the illustrated embodiment and are shown in the form of flexible belts the same as belts 50 and 50a. These intermediate belts 55 and 55a extend around pulleys 56 and 56a and 52, 52a for the auxiliary belts 50 and 50a but inwardly therefrom. Additional pulleys 57 and 57a support the belt 55 between pulleys 52, 52a and 56, 56a.

The bottom conveyor belt 47 is shown inclined downwardly but the whole slant conveyor including the bottom belt 47 may be positioned horizontally or upwardly. The belts 47, 50, 50a and 55a are driven at the same linear speed by suitable motors. For example, shaft 58 on which pulleys 48 and 51, 51a are mounted drive belts 50 and 50a and these latter belts drive pulleys 52, 52a and shaft 59 on which they are mounted to drive belts 55 and 55a.

Slats S and $S_1$ delivered from the double belt conveyor 18 fall onto the slant conveyors 46 and 46a, at a slight incline to the horizontal due to the support of their inner ends on the porous bottom belt 47 and their outer end portions by the belts 50 and 50a at a higher level. As the conveyor belts 47, and 50, 50a move forwardly the latter belts move upwardly with respect to the bottom conveyor until they reach the pulleys 53, 53a and thereby tilt the slat material at the angles illustrated in FIGURE 4. The slats S and $S_1$ then continue to move with their conveyors between the pulleys 53, 53a and 54, 54a at an incline to the horizontal to cause surplus solution to drain down the sides of the slats and through the porous wire mesh bottom conveyor 47 at the center portion thereof. Thus, the slant conveyors 46 and 46a control the dripping of surplus solution onto the porous wire mesh bottom conveyor 47 and also produces a uniform penetration into and coating on all surfaces of the slats S and $S_1$. A drip pan 60 underlies the bottom conveyor 47 and extends rearwardly at an angle to drain the surplus solution back into the tank 10, see FIGURE 1. In the illustrated embodiment, the slant conveyors 46 and 46a tilt the separate rows of slats S and $S_1$ at a reverse angle to each other as illustrated in FIGURE 4. After the slats S and $S_1$ have moved in a tilted inclined relation from the pulleys 53, 53a to the pulley 54, 54a, see FIGURES 1 and 2, the course of the upper conveyor 50 inclines downwardly toward the bottom conveyor 47 so that its discharge end at the pulleys 48 and 51, the relatively dry slats will have been returned to a horizontal position. The treated slats are then discharged from the dipping apparatus by a discharge conveyor 61 similar to the feed conveyor 11.

FIGURE 2 shows the separate rows of veneer slats S and $S_1$ in a flat horizontal relationship as they are advanced by the feeding conveyor 11 from the cutting blade (not shown) toward the double belt conveyor 18. Slats S and $S_1$ of the separate rows are further shown gripped between the bottom wire mesh belt 19 and overlying narrower belts 20 to 25, still in a generally horizontal arrangement as they move under the drum pulley 27 to immerse the slats in the treating solution in the tank 10 and then outwardly of the tank to the end of the conveyor. At the end of the double belt conveyor 18 the slats S and $S_1$ are shown in a generally horizontal arrangement as they are delivered onto the slant conveyors 46 and 46a. As the slats S and $S_1$ are advanced by the slant conveyors 46 and 46a the individual slats are tilted from a horizontal to an inclined position, see FIGURES 1 and 4. As the slats S and $S_1$ approach the discharge end of the slant conveyors 46 and 46a they are again tilted back to a horizontal relationship before being delivered onto the discharge conveyor 59.

FIGURE 4 shows slats S and $S_1$ in the separate rows supported at their lower ends by the bottom conveyor belt 47 and adjacent their opposite ends by belts 50 and 50a. In other words, the slats S and $S_1$ swing about their lower ends as their outer ends are raised by the upper supporting belts 50 and 50a. Under some conditions of operation the friction between the upper supporting belts 50, 50a and slats S and $S_1$ will pull the slats laterally as the outer ends are raised by the belts of the slant conveyors and under other conditions of operation the upper supporting belts 50 and 50a will slide relative to the slats. In any case, the intermediate belts 55 and 55a of the slant conveyors will limit the inclination of the slats S and $S_1$ and will also support shorter slats in an inclined position.

As explained above, the slats S and $S_1$ are shown in spaced relation in separate rows in FIGURES 1 to 4 of the drawings for ease of description and illustration. In actual practice the slats S and $S_1$ in the separate rows will be bunched together in multiple layers of varying numbers depending upon the manner in which the veneer sheet divides into slats at any particular time. Thus, the more usual situation is shown in FIGURE 5 where a plurality of overlying slats S and $S_1$ are delivered to the slant conveyors 46 and 46a. As the multiple layers of slats S and $S_1$ fall from conveyor 18 onto the slat conveyors 46 and 46a they engage the latter on an incline, due to the difference in the levels of bottom belt 47 and upper belts 50 and 50a, and tend to spread out and separate in the manner illustrated in FIGURE 5 as well as producing an initial tilt. The slats S and $S_1$ are then further separated as the outer ends are lifted by belts 50 and 50a. Such separation of the slats S and $S_1$ also facilitates draining of surplus solution therefrom and a uniform drying of all of the slats.

FIGURE 6 shows how a single slant conveyor 46 may be used with one row of slats S only. In this embodiment a rail 62 is shown overlying the bottom conveyor 47 to limit lateral sliding of the slats S to the right. Otherwise, this embodiment of the invention is substantially the same as the slant conveyor 46 in FIGURE 5.

FIGURE 7 is a view similar to FIGURE 5 showing how opposed slant conveyors 46 and 47 may be used for tilting rows of slats S and $S_1$ of different lengths. As will be observed, the slats S are of shorter length than the slats $S_1$ and are supported only by the intermediate supporting belt 55. The longer slats $S_1$, on the other hand, are supported by the upper belt 50a.

FIGURE 8 shows slant conveyors 46 and 46a in which only one upper supporting belt is provided. In the illustrated embodiment, supporting belts 50 and 50a are shown for tilting slats S and $S_1$ through a small angle, but it will be understood that the supporting belts could be high to tilt the slats through a greater angle or intermediate supporting belts 55 and 55a could be used. In other words, the present invention contemplates the use of a single upper supporting element as well as a plurality of supporting elements as shown in FIGURES 1 to 4.

It will now be observed that the present invention provides a slant conveyor for supporting slat material on an incline to more rapidly drain surplus solution from the slats and dry them in a more uniform manner. It will also be observed that the present invention provides a conveyor for automatically tilting slat material from a substantially horizontal to an upwardly inclined position to separate the slats as they are conveyed from the solution in which they have been immersed to control the draining of solution therefrom to a predetermined area. It will still further be observed that the present invention provides a slant conveyor for tilting the slat material which is of relatively simple and compact construction, economical to manufacture and one which is reliable in operation.

While several embodiments of the invention are herein shown and described, it will be understood that further changes may be made in the construction and arrangement of elements without departing from the spirit or scope of the invention. Therefore, without limitation in this respect, the invention is defined by the following claims.

I claim:

1. In an apparatus for treating slat material with a solution, a tank for the treating solution, means for subjecting all surfaces of the slats to the solution in the tank, means for delivering the wet treated slats from the tank in a generally parallel arrangement, a conveyor for moving the slat material away from the tank having inner and outer courses onto which the slat material is discharged, and guide means for guiding the outer course upwardly from its receiving end relative to the inner course to tilt the slat material at an angle to the horizontal and thereby drain surplus solution therefrom.

2. Apparatus for treating slat material in accordance with claim 1 in which the inner course of the conveyor for draining surplus solution from the slat material is a flat belt of porous material, the guide means for the outer course first directing it upwardly relative to the inner course, then parallel to the inner course and then downwardly relative to the inner course whereby to receive the slat material in a generally horizontal position and then tilt it so that it slants at an angle to the horizontal.

3. Apparatus in accordance with claim 2 in which the inner course of the conveyor comprises a flat bottom belt of porous wire mesh material for supporting one end of the slat material.

4. Apparatus in accordance with claim 2 in which an intermediate course is provided between the inner and outer courses and spaced inwardly relative to the outer course.

5. Apparatus for dipping slat material in accordance with claim 2 in which a rail is provided which projects upwardly from the flat porous bottom belt to limit the lateral movement of the lower end of the slat material.

6. Apparatus in accordance with claim 1 in which means are provided for advancing slat material toward and delivering it from the tank in adjacent rows, said means for moving slat material away from the tank and draining solution therefrom comprising a flat bottom belt of porous material, and outer courses at each side and above the inner course for tilting the adjacent rows of slat material at an angle to the horizontal as they are conveyed from the tank.

7. Apparatus for dipping slat material in accordance with claim 6 in which the outer courses at each side of the conveyor each comprises a moving element, and guide means for directing the element first upwardly and then parallel to the inner course as it moves away from the tank.

8. Apparatus for dipping slat material in accordance with claim 7 in which the tilting conveyor comprises an intermediate course between the inner and outer courses to tilt short slats and control the tilting of long slats.

9. In an apparaus for dipping slat material in a liquid and of the type having a tank containing the liquid and a conveyor for moving the slat material through the tank to immerse it in the liquid, the combination with said elements of a slat draining means at the discharge end of said conveyor comprising a porous lower slat-supporting element on which the ends of the slats may rest and arranged in alignment with one end of the slats delivered from the conveyor, an upper slat-supporting element in alignment with an intermediate portion of the slats delivered from the conveyor, and a drive for continuously moving said upper and lower slat-supporting elements away from the conveyor whereby slat material delivered from said tank is laid on the upper and lower supporting elements by the conveyor and supported by the upper and lower elements on a slant to the horizontal to facilitate the draining of surplus liquid from the slat material and through the porous lower slat-supporting element.

References Cited

UNITED STATES PATENTS

| 1,011,280 | 12/1911 | Trout et al. | 21—70 |
| 3,363,743 | 1/1968 | Pfeiffer | 198—41 |

MORRIS O. WOLK, *Primary Examiner.*

BARRY S. RICHMAN, *Assistant Examiner.*

U.S. Cl. X.R.

21—7; 117—102; 118—56, 423; 134—67, 127; 198—33, 165